United States Patent
Takayama et al.

(10) Patent No.: US 9,601,988 B2
(45) Date of Patent: Mar. 21, 2017

(54) POWER CONVERSION APPARATUS AND METHOD FOR ANALYZING FOR ABNORMALITY IN POWER CONVERSION APPARATUS HAVING CUTOFF DEVICES

(71) Applicant: KABUSHIKI KAISHA YASKAWA DENKI, Kitakyushu-shi (JP)

(72) Inventors: Shigenori Takayama, Kitakyushu (JP); Satoshi Sueshima, Kitakyushu (JP); Keisei Inoki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 52 days.

(21) Appl. No.: 14/719,697

(22) Filed: May 22, 2015

(65) Prior Publication Data
US 2015/0340960 A1  Nov. 26, 2015

(30) Foreign Application Priority Data
May 23, 2014  (JP) .................................. 2014-107190

(51) Int. Cl.
*H02M 5/297* (2006.01)
*H02M 1/32* (2007.01)
(Continued)

(52) U.S. Cl.
CPC ............ *H02M 1/32* (2013.01); *H02H 7/0844* (2013.01); *H02M 5/297* (2013.01); *H02H 3/05* (2013.01); *H02H 7/1216* (2013.01)

(58) Field of Classification Search
CPC ...... H02H 7/1216; H02M 5/297; H02M 5/27; H02M 5/271–5/273
See application file for complete search history.

(56) References Cited

U.S. PATENT DOCUMENTS

| 8,476,860 B2* | 7/2013 | Sato ................. H02M 7/53875 318/400.13 |
| 2010/0309589 A1* | 12/2010 | Ueki ...................... H02M 1/32 361/18 |

(Continued)

FOREIGN PATENT DOCUMENTS

| EP | 2426803 | 3/2012 |
| EP | 2733807 | 5/2014 |

(Continued)

OTHER PUBLICATIONS

Okamoto et al., "Development of Low Voltage 2 Level IGBT Inverter and Converter for Industrial Application", Power Electronics and ECCE Asia (ICPE & ECCE), May 30, 2011, pp. 2466-2473, XP031956319, See Cite No. 4.

(Continued)

*Primary Examiner* — Gary L Laxton
*Assistant Examiner* — Peter Novak
(74) *Attorney, Agent, or Firm* — Mori & Ward, LLP

(57) ABSTRACT

A power conversion apparatus includes a power converter to directly convert AC power having a frequency into AC power having a different frequency. A gate driver drives the power converter. A gate drive signal generator generates a gate drive signal supplied to the gate driver. Two cutoff devices are coupled between the gate driver and the gate drive signal generator, and supply or cut off the gate drive signal to the gate driver based on a command from an external apparatus. At least one of the two cutoff devices generates a feedback signal. An analyzer determines whether the one cutoff device has an abnormality based on the command and the feedback signal. A cutoff controller controls another one of the two cutoff devices to cut off the gate drive signal to the gate driver when the analyzer determines that the one cutoff device has the abnormality.

16 Claims, 2 Drawing Sheets

(51) Int. Cl.
*H02H 7/08* (2006.01)
*H02H 3/05* (2006.01)
*H02H 7/12* (2006.01)

(56) References Cited

U.S. PATENT DOCUMENTS

2014/0139159 A1* 5/2014 Sato ..................... H02M 1/32
318/400.22
2015/0054443 A1* 2/2015 Swamy ................. H02P 27/16
318/504

FOREIGN PATENT DOCUMENTS

| JP | 5370724 B | 5/2010 |
|----|-----------|--------|
| JP | 2010-148334 | 7/2010 |

OTHER PUBLICATIONS

Extended European Search Report for corresponding EP Application No. 15168842.1-1809, Oct. 21, 2015.
Japanese Office Action for corresponding JP Application No. 2014-107190, Oct. 4, 2016 (w/ machine translation).

* cited by examiner

POWER CONVERSION APPARATUS AND METHOD FOR ANALYZING FOR ABNORMALITY IN POWER CONVERSION APPARATUS HAVING CUTOFF DEVICES

CROSS-REFERENCE TO RELATED APPLICATIONS

The present application claims priority under 35 U.S.C. §119 to Japanese Patent Application No. 2014-107190, filed May 23, 2014. The contents of this application are incorporated herein by reference in their entirety.

BACKGROUND

Field of the Invention

The embodiments disclosed herein relate to a power conversion apparatus and a method for analyzing for an abnormality in a power conversion apparatus.

Discussion of the Background

Some power conversion apparatuses are equipped with inverters to generate alternating-current (AC) power, and many of such power conversion apparatuses are used to drive motors. As this kind of power conversion apparatus, Japanese Patent No. 5370724 discloses a motor control apparatus that includes an inverter to generate AC power from direct-current (DC) power.

The motor control apparatus disclosed in Japanese Patent No. 5370724 includes a gate drive circuit, a PWM (pulse width modulation) generation circuit, and two tri-state buffers. The gate drive circuit drives the inverter. The PWM generation circuit generates PWM signals to be supplied to the gate drive circuit. The two tri-state buffers are coupled in series between the gate drive circuit and the PWM generation circuit. The gates of the two tri-state buffers are opened and closed in conjunction with handling of two external shutdown switches respectively corresponding to the two tri-state buffers. In the motor control apparatus, the two external shutdown switches respectively close the gates of the two tri-state buffers to cut off the supply of the PWM signals to the gate drive circuit, in order to stop the inverter and stop the motor. This eliminates the need for an electromagnetic contactor conventionally disposed between the motor and the inverter. This, in turn, saves the space of the motor control apparatus, and reduces the cost of the system as a whole. In addition, duplicated safety shutdown circuitry of the shutdown switches and the tri-state buffers improves safety.

The motor control apparatus generates a logical product of signals indicating an abnormality of the tri-state buffer. This enables an external upper level apparatus to determine an abnormality of the safety shutdown circuit itself, which further improves safety.

SUMMARY

According to one aspect of the present disclosure, a power conversion apparatus includes a power converter, a gate driver, a gate drive signal generator, two cutoff devices, an analyzer, and a cutoff controller. The power converter is configured to directly convert first AC power having a first frequency into second AC power having a second frequency different from the first frequency. The gate driver is configured to drive the power converter. The gate drive signal generator is configured to generate a gate drive signal to be supplied to the gate driver. The two cutoff devices are coupled between the gate driver and the gate drive signal generator and are configured to supply or cut off the gate drive signal to the gate driver based on a command from an external apparatus. At least one cutoff device among the two cutoff devices is configured to generate a first feedback signal related to an output signal of the at least one cutoff device. The analyzer is configured to analyze the command and the first feedback signal so as to determine whether the at least one cutoff device has a first abnormality. The cutoff controller is configured to control another cutoff device among the two cutoff devices to cut off the gate drive signal to the gate driver when the analyzer determines that the at least one cutoff device has the first abnormality.

According to another aspect of the present disclosure, a method is for analyzing for an abnormality in a power conversion apparatus has an abnormality. The power conversion apparatus includes a power converter, a gate driver, a gate drive signal generator, and two cutoff devices. The power converter is configured to directly convert first AC power having a first frequency into second AC power having a second frequency different from the first frequency. The gate driver is configured to drive the power converter. The gate drive signal generator is configured to generate a gate drive signal to be supplied to the gate driver. The two cutoff devices are coupled between the gate driver and the gate drive signal generator and are configured to supply or cut off the gate drive signal to the gate driver based on a command from an external apparatus. At least one cutoff device among the two cutoff devices is configured to generate a feedback signal related to an output signal of the at least one cutoff device. The method includes analyzing the command and the feedback signal so as to determine whether the at least one cutoff device has the abnormality. Another cutoff device among the two cutoff devices is controlled to cut off the gate drive signal to the gate driver when the at least one cutoff device is determined as having the abnormality.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
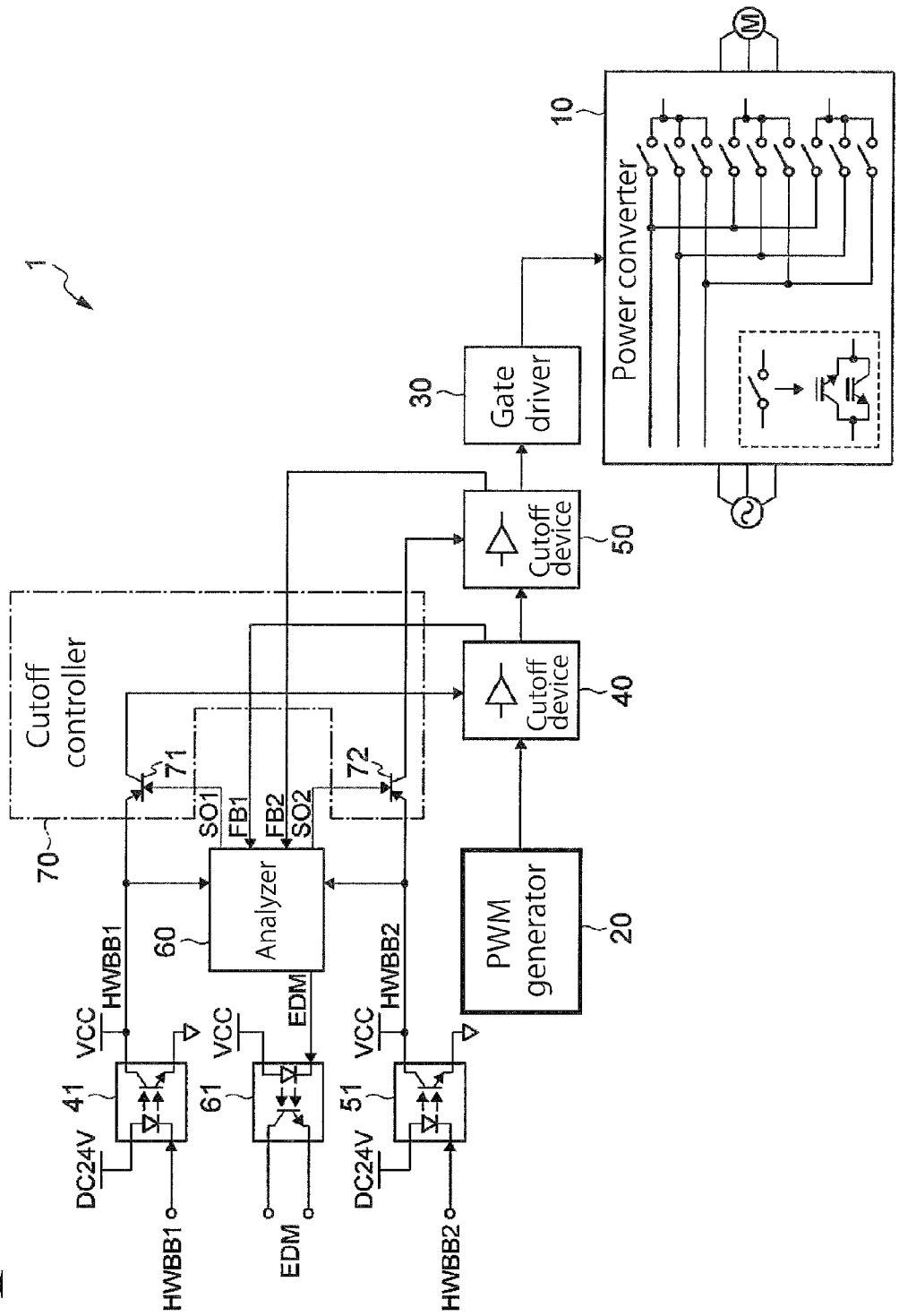
FIG. 1 is a circuit block diagram illustrating a power conversion apparatus according to an embodiment.

The embodiments will now be described with reference to the accompanying drawings, wherein like reference numerals designate corresponding or identical elements throughout the various drawings.

FIG. 1 is a circuit block diagram illustrating a power conversion apparatus according to an embodiment. As illustrated in FIG. 1, a power conversion apparatus 1 includes a power converter (power conversion circuit) 10, a PWM generator (PWM generation circuit, gate drive signal generator, gate drive signal generation circuit) 20, a gate driver (gate drive circuit) 30, two cutoff devices (cutoff circuits, gate buffers) 40 and 50, an analyzer (analyzing means, determination circuit) 60, a cutoff controller (cutoff controlling means, cutoff control circuit) 70, and photocouplers 41, 51, and 61.

The power converter 10 includes a plurality of switching elements to directly convert AC power having a frequency into AC power having a different frequency. In an exemplary case with a three-phase AC motor, the power converter 10 includes a matrix converting device circuit (cycloconverter circuit) to directly convert three-phase AC power having a frequency into three-phase AC power having a different frequency. The matrix converting device circuit includes nine bidirectional switches between a three-phase AC power source and the three-phase AC motor. The nine bidirectional switches are divided into three groups each made up of three bidirectional switches. In a first group, the three bidirectional switches have first ends respectively coupled to a U phase, a V phase, and a W phase of the three-phase AC power source, and have second ends coupled to a U phase of the three-phase AC motor. In a second group, the three bidirectional switches have first ends respectively coupled to the U phase, the V phase, and the W phase of the three-phase AC power source, and have second ends coupled to a V phase of the three-phase AC motor. In a third group, the three bidirectional switches have first ends respectively coupled to the U phase, the V phase, and the W phase of the three-phase AC power source, and have second ends coupled to a W phase of the three-phase AC motor. Each of the nine bidirectional switches includes two switching elements. That is, the power converter 10 includes 18 switching elements. Examples of the switching elements include, but are not limited to, a FET (field effect transistor) and an IGBT (insulated gate bipolar transistor). The PWM generator 20 and the gate driver 30 drive the power converter 10.

Based on a command (for example, HWBB1 or HWBB2, described later) from an external upper level apparatus (which corresponds to the external apparatus recited in the claims), the PWM generator 20 generates PWM (Pulse Width Modulation) signals to drive the power converter 10. For example, the PWM generator 20 generates six PWM signals for the 18 switching elements of the power converter 10. The PWM generator 20 supplies the PWM signals to the gate driver 30. Depending on the command from the external upper level apparatus, the PWM generator 20 stops supplying the PWM signals to the gate driver 30.

Based on the PWM signals from the PWM generator 20, the gate driver 30 generates driving signals to drive the power converter 10. Based on the six PWM signals from the PWM generator 20, the gate driver 30 generates, for example, 18 driving signals to respectively drive the 18 switching elements in the power converter 10. Between the PWM generator 20 and the gate driver 30, two cutoff devices 40 and 50 are coupled in series.

Based on the command HWBB1 from the external upper level apparatus, the cutoff device 40 supplies or cuts off the PWM signal from the PWM generator 20 to the gate driver 30. Based on the command HWBB2 from the external upper level apparatus, the cutoff device 50 supplies or cuts off the PWM signal from the PWM generator 20 to the gate driver 30. The cutoff devices 40 and 50 each include, for example, six tri-state buffers for the six PWM signals. The command HWBB1 is input into an enable terminal of the cutoff device 40 through the photocoupler 41, and the command HWBB2 is input into an enable terminal of the cutoff device 50 through the photocoupler 51.

Here, the commands HWBB1 and HWBB2 are for stopping the supply of the driving signals to the power converter 10 so as to stop the motor. That is, the commands HWBB1 and HWBB2 are for cutting off the supply of the PWM signals from the PWM generator 20 to the gate driver 30. The commands HWBB1 and HWBB2 each include a normally-on signal. For example, the commands HWBB1 and HWBB2 are at LOW level when the motor is driven into operation, and at HIGH level when the motor is stopped. The commands HWBB1 and HWBB2 may include signals output from the two shutdown switches recited in Japanese Patent No. 5370724.

For example, when the command HWBB1 is at LOW level, which indicates that the motor is to operate, the photocoupler 41 turns ON to allow the LOW, operation-indicating command HWBB1 to be input into the enable terminal of the cutoff device 40. In response to the LOW, operation-indicating command HWBB1, the gates of the tri-state buffers of the cutoff device 40 open to allow the supply of the PWM signals from the PWM generator 20 to the cutoff device 50. Similarly, when the command HWBB2 is at LOW level, which indicates that the motor is to operate, the photocoupler 51 turns ON to allow the LOW, operation-indicating command HWBB2 to be input into the enable terminal of the cutoff device 50. In response to the LOW, operation-indicating command HWBB2, the gates of the tri-state buffers of the cutoff device 50 open to allow the supply of the PWM signals from the cutoff device 40 to the gate driver 30.

When the command HWBB1 is at HIGH level, which indicates that the motor is to stop, the photocoupler 41 turns OFF to allow the HIGH, stop-indicating command HWBB1 to be input into the enable terminal of the cutoff device 40. In response to the HIGH, stop-indicating command HWBB1, the gates of the tri-state buffers of the cutoff device 40 close, and thus the outputs of the tri-state buffers turn into high impedance state. This causes the cutoff device 40 to cut off the supply of the PWM signals from the PWM generator 20 to the cutoff device 50. Similarly, when the command HWBB2 is at HIGH level, which indicates that the motor is to stop, the photocoupler 51 turns OFF to allow the HIGH, stop-indicating command HWBB2 to be input into the enable terminal of the cutoff device 50. In response to the HIGH, stop-indicating command HWBB2, the gates of the tri-state buffers of the cutoff device 40 close, and thus the outputs of the tri-state buffers turn into high impedance state. This causes the cutoff device 50 to cut off the supply of the PWM signals from the cutoff device 40 to the gate driver 30. Thus, the cutoff devices 40 and 50 ensure duplicated safety shutdown circuitry as in Japanese Patent No. 5370724, and the duplicated safety shutdown circuitry improves safety.

The cutoff device 40 supplies a feedback signal FB1 to the analyzer 60, and the cutoff device 50 supplies a feedback signal FB2 to the analyzer 60. The feedback signal FB1 is related to the output signal of the cutoff device 40 and includes information indicating that the cutoff device 40 is normal or abnormal. The feedback signal FB2 is related to the output signal of the cutoff device 50 and includes information indicating that the cutoff device 50 is normal or abnormal. For example, when the cutoff device 40 is normal, the feedback signal FB1 is at LOW level. When the cutoff device 50 is normal, the feedback signal FB2 is at LOW level. When the cutoff device 40 has an abnormality, the feedback signal FB1 is at HIGH level. When the cutoff device 50 has an abnormality, the feedback signal FB2 is at HIGH level.

The analyzer 60 analyzes the command HWBB1 from the external upper level apparatus and the feedback signal FB1 from the cutoff device 40 so as to determine whether the cutoff device 40 is normal or abnormal. The analyzer 60 also analyzes the command HWBB2 from the external upper level apparatus and the feedback signal FB2 from the cutoff device 50 so as to determine whether the cutoff device 50 is normal or abnormal. When the analyzer 60 determines that the cutoff device 40 or the cutoff device 50 has an abnormality, the analyzer 60 sends a notification indicating the abnormality to the cutoff controller 70.

The analyzer 60 includes a CPU (Central Processing Unit), a ROM (Read Only Memory), and a RAM (Random Access Memory). In the analyzer 60, the CPU executes a program stored in the ROM to implement the functions of the analyzer 60.

The analyzer 60 is programmed and configured to notify the cutoff controller 70 of a LOW signal SO1 when the command HWBB1 is at LOW level, which indicates that the motor is to operate, so as to cause the cutoff controller 70 to supply the LOW, operation-indicating command HWBB1 to the cutoff device 40. The analyzer 60 is also programmed and configured to notify the cutoff controller 70 of a LOW signal SO2 when the command HWBB2 is at LOW level, which indicates that the motor is to operate, so as to cause the cutoff controller 70 to supply the LOW, operation-indicating command HWBB2 to the cutoff device 50.

The analyzer 60 is also programmed and configured to determine that the cutoff device 40 is normal when the command HWBB1 is at LOW level, which indicates that the motor is to operate, and when the feedback signal FB1 is at LOW level, and to continue the supply of the LOW signal SO2 to the cutoff controller 70. Similarly, the analyzer 60 is programmed and configured to determine that the cutoff device 50 is normal when the command HWBB2 is at LOW level, which indicates that the motor is to operate, and when the feedback signal FB2 is at LOW level, and to continue the supply of the LOW signal SO1 to the cutoff controller 70.

The analyzer 60 is also programmed and configured to determine that that the cutoff device 40 has an abnormality when the command HWBB1 is at LOW level, which indicates that the motor is to operate, and when the feedback signal FB1 is at HIGH level, and to notify the cutoff controller 70 of the abnormality by sending the HIGH signal SO2, which indicates the abnormality, to the cutoff controller 70. Similarly, the analyzer 60 is programmed and configured to determine that the cutoff device 50 has an abnormality when the command HWBB2 is at LOW level, which indicates that the motor is to operate, and when the feedback signal FB2 is at HIGH level, and to notify the cutoff controller 70 of the abnormality by sending the HIGH signal SO1, which indicates the abnormality, to the cutoff controller 70.

The analyzer 60 is also programmed and configured to generate logical product signals EDM, which indicate the abnormalities of the cutoff devices 40 and 50. The signals EDM are supplied to the external upper level apparatus through the photocoupler 61 (EDM monitoring). This enables the external upper level apparatus to detect the abnormalities of the safety shutdown circuits themselves as in Japanese Patent No. 5370724, which improves safety.

When the analyzer 60 determines that the cutoff device 40 has an abnormality, the cutoff controller 70 cuts off the command HWBB2 to the cutoff device 50. When the analyzer 60 determines that the cutoff device 50 has an abnormality, the cutoff controller 70 cuts off the command HWBB1 to the other cutoff device 40.

The cutoff controller 70 includes, for example, two transistors 71 and 72. The transistor 71 is coupled in series to the enable terminal of the cutoff device 40, and the transistor 72 is coupled in series to the enable terminal of the cutoff device 50. The collector of the transistor 71 is coupled to the enable terminal of the cutoff device 40. The emitter of the transistor 71 receives the command HWBB1 through the photocoupler 41. The base of the transistor 71 receives the signal SO1 from the analyzer 60. The collector of the transistor 72 is coupled to the enable terminal of the cutoff device 50. The emitter of the transistor 72 receives the command HWBB2 through the photocoupler 51. The base of the transistor 72 receives the signal SO2 from the analyzer 60.

For example, the transistor 71 of the cutoff controller 70 turns ON upon receipt of the LOW signal SO1 from the analyzer 60, and supplies the command HWBB1 to the cutoff device 40. The transistor 72 of the cutoff controller 70 turns OFF upon receipt of the LOW signal SO2 from the analyzer 60, and supplies the command HWBB2 to the cutoff device 50.

The transistor 71 of the cutoff controller 70 turns OFF upon receipt of the HIGH signal SO1, which indicates the abnormality of the cutoff device 50, from the analyzer 60, and cuts off the command HWBB1 to the cutoff device 40. Similarly, the transistor 72 of the cutoff controller 70 turns OFF upon receipt of the HIGH signal SO2, which indicates the abnormality of the cutoff device 40, from the analyzer 60, and cuts off the command HWBB2 to the cutoff device 50.

Next, description will be made with regard to operations of the power converter and a method for analyzing for an abnormality. Upon input of the LOW, operation-indicating commands HWBB1 and HWBB2, the signals SO1 and SO2 from the analyzer 60 turn into LOW level to cause the transistors 71 and 72 of the cutoff controller 70 to turn ON. This allows the LOW, operation-indicating commands HWBB1 and HWBB2 to be respectively supplied to the cutoff devices 40 and 50.

When the cutoff devices 40 and 50 are normal, the gates of the tri-state buffers of the cutoff devices 40 and 50 open to allow the PWM signals to be from the PWM generator 20 to the gate driver 30. Here, the feedback signals FB1 and FB2 respectively from the cutoff devices 40 and 50 turn into LOW level. Then, the analyzer 60 analyzes the LOW, operation-indicating commands HWBB1 and HWBB2 and the LOW feedback signals FB1 and FB2, and determines that the cutoff devices 40 and 50 are normal. In this case, the analyzer 60 keeps the signals SO1 and SO2 at LOW level. This causes the cutoff controller 70 to continue the supply of the LOW, operation-indicating commands HWBB1 and HWBB2 respectively to the cutoff devices 40 and 50. This, in turn, causes the cutoff devices 40 and 50 to continue the supply of the PWM signals from the PWM generator 20 to the gate driver 30.

In an exemplary case where the cutoff device 40 has an abnormality, the feedback signal FB1 from the cutoff device 40 is at HIGH level. Then, the analyzer 60 analyzes the LOW, operation-indicating command HWBB1 and the HIGH feedback signal FB1, and determines that the cutoff device 40 has the abnormality. In this case, the analyzer 60 notifies the cutoff controller 70 of the abnormality by sending the HIGH signal SO2, which indicates the abnormality, to the cutoff controller 70. The HIGH signal SO2 causes the transistor 72 of the cutoff controller 70 to turn OFF, which in turn causes the cutoff controller 70 to cut off the command HWBB2 to the cutoff device 50. Then, the normal cutoff device 50 cuts off the PWM signals from the PWM generator 20 to the gate driver 30.

When the cutoff device 50 has an abnormality, the feedback signal FB2 from the cutoff device 50 is at HIGH level. Then, the analyzer 60 analyzes the LOW, operation-indicating command HWBB2 and the HIGH feedback signal FB2, and determines that the cutoff device 50 has the abnormality. In this case, the analyzer 60 notifies the cutoff controller 70 of the abnormality by sending the HIGH signal SO1, which indicates the abnormality, to the cutoff controller 70. The HIGH signal SO1 causes the transistor 71 of the cutoff controller 70 to turn OFF, which in turn causes the cutoff controller 70 to cut off the command HWBB1 to the cutoff device 40. Then, the normal cutoff device 40 cuts off the PWM signals from the PWM generator 20 to the gate driver 30.

The power converter according to this embodiment includes the analyzer 60 and the cutoff controller 70. The analyzer 60 determines whether at least one cutoff device among the two cutoff devices 40 and 50 has an abnormality. When the analyzer 60 determines that the at least one cutoff device has the abnormality, the cutoff controller 70 controls the other cutoff device among the two cutoff devices 40 and 50 to cut off the PWM signals to the gate driver 30. This eliminates the need for the intervention of any external upper level apparatus in detecting an abnormality of the cutoff devices 40 and 50, which serve as the safety shutdown circuits. Here, when one of the cutoff devices has an abnormality, then the other, normal cutoff device is controlled to cut off the PWM signals, which improves safety.

According to the European lift safety standards, meeting SIL3 of the safety standard IEC 61508 is a requirement in order to eliminate an electromagnetic contactor between a motor and a power converter. The motor control apparatus disclosed in Japanese Patent No. 5370724, however, meets or is equivalent to SIL2 of the safety standard IEC 61508, instead of SIL3. Hence, in Europe, the motor control apparatus disclosed in Japanese Patent No. 5370724 has not been allowed to eliminate the electromagnetic contactor. This has made it impossible or difficult to market smaller-sized lifts (elevators) in Europe with reduced costs using the motor control apparatus disclosed in Japanese Patent No. 5370724. In this respect, the power converter according to this embodiment meets or is equivalent to SIL3 of the safety standard IEC 61508, and thus finds applications in European-oriented lifts (elevators) with the electromagnetic contactor eliminated. Since the power converter according to this embodiment used in European-oriented lifts (elevators) eliminates the electromagnetic contactor, the European-oriented lifts (elevators) would be smaller in size and reduced in cost.

In this embodiment, one cutoff device among the two cutoff devices 40 and 50 may generate a feedback signal related to the output signal of the one cutoff device, and the analyzer 60 may analyze the command and the feedback signal from the one cutoff device so as to determine whether the one cutoff device has an abnormality. In this case, when the analyzer 60 determines that the one cutoff device has the abnormality, the analyzer 60 may send a notification indicating the abnormality to the cutoff controller 70. In response to the notification from the analyzer 60, the cutoff controller 70 may cut off the command to the other cutoff device among the two cutoff devices 40 and 50 so as to control the other cutoff device to cut off the PWM signals to the gate driver 30.

In this embodiment, the two cutoff devices 40 and 50 may both generate feedback signals FB1 and FB2 related to the output signals of the two cutoff devices 40 and 50. Then, the analyzer 60 may analyze the commands HWBB1 and HWBB2 and the feedback signals FB1 and FB2 respectively from the two cutoff devices 40 and 50, so as to determine whether the cutoff device 40 has an abnormality and determine whether the cutoff device 50 has an abnormality. In this case, when the analyzer 60 determines that any one cutoff device among the two cutoff devices 40 and 50 has an abnormality, the analyzer 60 may notify the cutoff controller 70 of the abnormality by sending the signal SO1 and the signal SO2 to the cutoff controller 70. In response to the signals SO1 and SO2 from the analyzer 60, the cutoff controller 70 may cut off the command to the other cutoff device among the two cutoff devices 40 and 50 so as to cause the other cutoff device to cut off the PWM signals to the gate driver 30.

Figure 2:
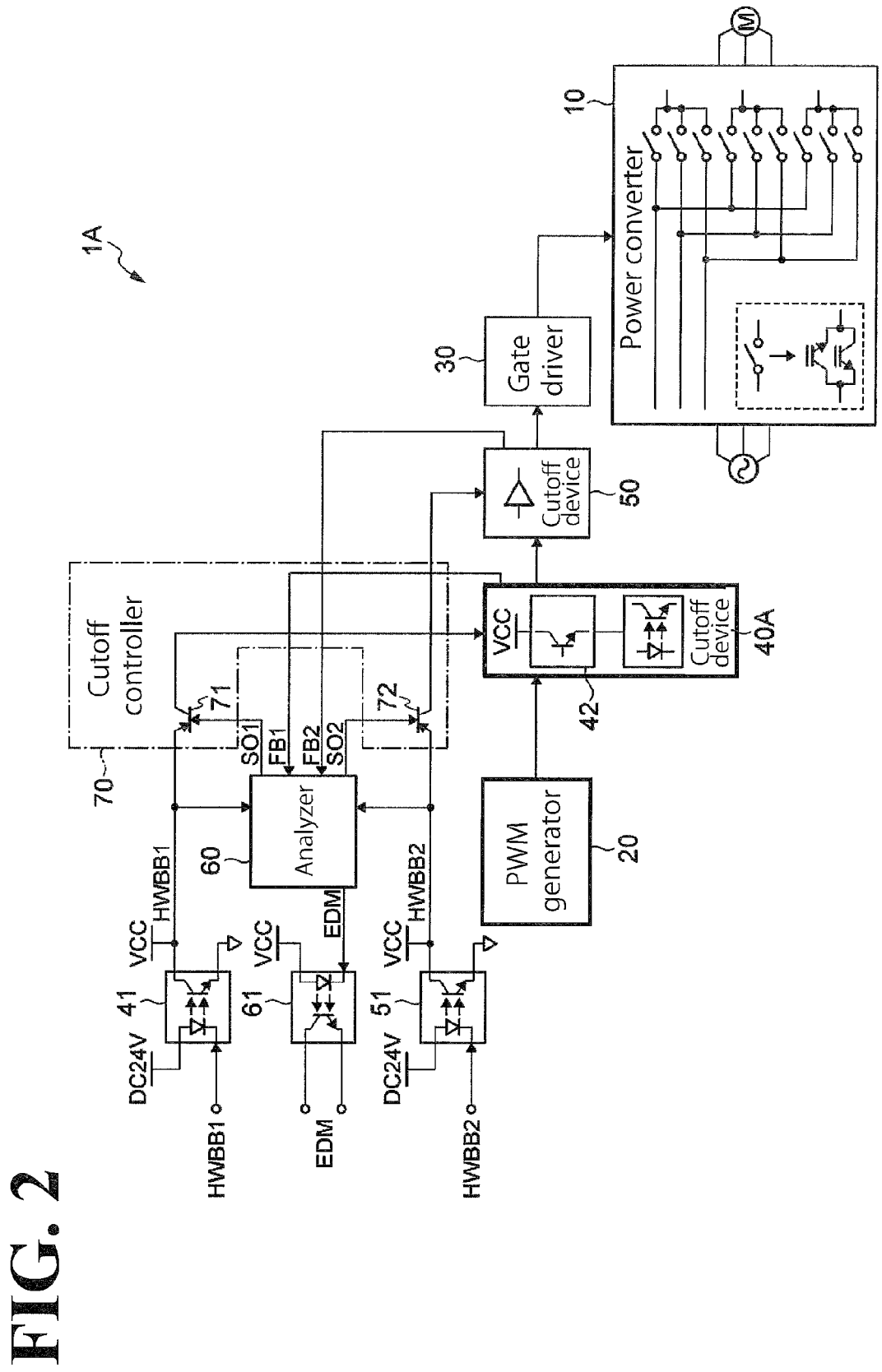
FIG. 2 is a circuit block diagram illustrating a power conversion apparatus according to another embodiment.

FIG. 2 is a circuit block diagram illustrating a power conversion apparatus according to another embodiment. A power conversion apparatus 1A illustrated in FIG. 2 is different from the power conversion apparatus 1 in that the power conversion apparatus 1A includes a cutoff device 40A, instead of the cutoff device 40, in the power conversion apparatus 1. The power conversion apparatus 1A is otherwise similar to the power conversion apparatus 1.

The cutoff device 40A includes, for example, six photocouplers for six PWM signals. The cutoff device 40A also includes a shut-off circuit 42. The shut-off circuit 42 includes a transistor and supplies or cuts off power source voltage to the six photocouplers. For example, upon supply of the LOW command HWBB1 from the cutoff controller 70, the transistor of the shut-off circuit 42 turns ON to cause the shut-off circuit 42 to supply power source voltage Vcc to the photocouplers. This causes the photocouplers to turn ON to allow the supply of the PWM signals from the PWM generator 20 to the gate driver 30. For another example, upon supply of the HIGH command HWBB1 from the cutoff controller 70, the transistor of the shut-off circuit 42 turns OFF to cause the shut-off circuit 42 to cut off the power source voltage Vcc to the photocouplers. This causes the photocouplers to turn OFF to cut off the PWM signals from the PWM generator 20 to the gate driver 30.

When the cutoff device 50 has an abnormality and the supply of the LOW command HWBB1 from the cutoff controller 70 is cut off, the transistor of the shut-off circuit 42 turns OFF to cause the shut-off circuit 42 to cut off the power source voltage Vcc to the photocouplers. This causes the photocouplers to turn OFF to cut off the PWM signals from the PWM generator 20 to the gate driver 30. Thus, when the supply of the LOW command HWBB1 from the cutoff controller 70 is cut off, the cutoff device 40A uses the shut-off circuit 42 to cut off the power source voltage Vcc to the photocouplers, thereby cutting off the PWM signals from the PWM generator 20 to the gate driver 30.

The cutoff device 40A may use the feedback signal FB1 to notify the analyzer 60 of an abnormality of the shut-off circuit 42. In this case, the analyzer 60 analyzes the feedback signal FB1 from the shut-off circuit 42 so as to determine that the shut-off circuit 42 has the abnormality. For example, when the abnormality is in the opening action of the transistor of the shut-off circuit 42, the analyzer 60 may be programmed and configured to determine this abnormality of the transistor using the LOW, operation-indicating command HWBB1 and the feedback signal FB1 indicating the abnormality of the shut-off circuit 42. For another example, when the abnormality is a short-circuit in the transistor of the shut-off circuit 42, the analyzer 60 may be programmed and configured to determine this abnormality using the HIGH, stop-indicating command HWBB1 and the feedback signal FB1 indicating the abnormality of the shut-off circuit 42.

In the power conversion apparatus 1A according to another embodiment, the cutoff device 40A includes the photocouplers and the shut-off circuit 42. The shut-off circuit 42 cuts off the power source voltage to the photocouplers. This ensures reliable cutoff of the PWM signals from the PWM generator 20 to the gate driver 30, resulting in improved safety.

The order in which the cutoff devices 40 and 50 are arranged in the power conversion apparatus 1 may vary, and the order in which the cutoff devices 40A and 50 are arranged in the power conversion apparatus 1A may vary. In the power conversion apparatus 1A, the cutoff device 50 may have an identical configuration to the configuration of the cutoff device 40A. In the above-described embodiments, duplicated safety shutdown circuitry made up of two cutoff devices has been illustrated. It is also possible to use three or more cutoff devices to implement triplicated or more than triplicated safety shutdown circuitry. In the above-described embodiments, the PWM generator 20, which generates the PWM signals, is an example of the gate drive signal generator to generate the gate drive signals to be supplied to the gate driver 30. This, however, should not be construed as limiting the gate drive signal generator. Another possible example is that the gate drive signal generator generates square wave signals (ON/OFF signals for the switch) instead of the PWM signals. It will be readily appreciated by one of ordinary skill in the art based on the present disclosure that the analyzer 60 may be a combination of circuit elements such as a logical circuit.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A power conversion apparatus comprising:
   a power converter configured to convert first AC power comprising a first frequency into second AC power comprising a second frequency different from the first frequency;
   a gate driver configured to drive the power converter;
   a gate drive signal generator configured to generate a gate drive signal to be supplied to the gate driver;
   two cutoff devices coupled between the gate driver and the gate drive signal generator and configured to supply or cut off the gate drive signal to the gate driver based on a command from an external apparatus, at least one cutoff device among the two cutoff devices being configured to generate a first feedback signal related to an output signal of the at least one cutoff device;
   an analyzer configured to analyze the command from the external apparatus and the first feedback signal from the at least one cutoff device so as to determine whether the at least one cutoff device has a first abnormality; and
   a cutoff controller configured to control another cutoff device among the two cutoff devices to cut off the gate drive signal to the gate driver when the analyzer determines that the at least one cutoff device has the first abnormality.

2. The power conversion apparatus according to claim 1, wherein when the analyzer determines that the at least one cutoff device has the first abnormality, the analyzer is configured to send a notification indicating the first abnormality to the cutoff controller, and
   wherein in response to the notification from the analyzer, the cutoff controller is configured to cut off the command to the another cutoff device so as to control the another cutoff device to cut off the gate drive signal to the gate driver.

3. The power conversion apparatus according to claim 2, wherein in response to the cutoff controller cutting off the command, the another cutoff device is configured to cut off power from a power source so as to cut off the gate drive signal to the gate driver.

4. The power conversion apparatus according to claim 3, wherein the gate drive signal comprises at least one signal among a PWM signal and a square wave signal.

5. The power conversion apparatus according to claim 2, wherein the gate drive signal comprises at least one signal among a PWM signal and a square wave signal.

6. The power conversion apparatus according to claim 1, wherein the another cutoff device is configured to generate a second feedback signal related to an output signal of the another cutoff device, and
   wherein the analyzer is configured to analyze the command and the second feedback signal so as to determine whether the another cutoff device has a second abnormality.

7. The power conversion apparatus according to claim 6, wherein when the analyzer determines that the at least one cutoff device has the first abnormality or that the another cutoff device has the second abnormality, the analyzer is configured to send a notification indicating the first abnormality or the second abnormality to the cutoff controller, and
   wherein in response to the notification from the analyzer, the cutoff controller is configured to cut off the command to the at least one cutoff device or the another cutoff device that has not determined as having the first abnormality or the second abnormality by the analyzer so as to control the at least one cutoff device or the another cutoff device that has not determined as having the first abnormality or the second abnormality to cut off the gate drive signal to the gate driver.

8. The power conversion apparatus according to claim 7, wherein in response to the cutoff controller cutting off the command, the another cutoff device is configured to cut off power from a power source so as to cut off the gate drive signal to the gate driver.

9. The power conversion apparatus according to claim 8, wherein the gate drive signal comprises at least one signal among a PWM signal and a square wave signal.

10. The power conversion apparatus according to claim 6, wherein the gate drive signal comprises at least one signal among a PWM signal and a square wave signal.

11. The power conversion apparatus according to claim 7, wherein the gate drive signal comprises at least one signal among a PWM signal and a square wave signal.

12. The power conversion apparatus according to claim 1, wherein the gate drive signal comprises at least one signal among a PWM signal and a square wave signal.

13. The power conversion apparatus according to claim 1, wherein the command from the external apparatus and the feedback signal from the at least one cutoff device are input to the analyzer as separate signals.

14. The power conversion apparatus according to claim 1, wherein the analyzer is configured to determine whether the at least one cutoff device has the first abnormality by analyzing a level of the command from the external apparatus and a level of the feedback signal from the at least one cutoff device.

15. A method for analyzing for an abnormality in a power conversion apparatus, the power conversion apparatus comprising:
   a power converter configured to convert first AC power comprising a first frequency into second AC power comprising a second frequency different from the first frequency;

a gate driver configured to drive the power converter;

a gate drive signal generator configured to generate a gate drive signal to be supplied to the gate driver; and two cutoff devices coupled between the gate driver and the gate drive signal generator and configured to supply or cut off the gate drive signal to the gate driver based on a command from an external apparatus, at least one cutoff device among the two cutoff devices being configured to generate a feedback signal related to an output signal of the at least one cutoff device comprising:

analyzing the command from the external apparatus and the feedback signal from the at least one cutoff device so as to determine whether the at least one cutoff device has the abnormality; and controlling another cutoff device among the two cutoff devices to cut off the gate drive signal to the gate driver when the at least one cutoff device is determined as having the abnormality.

16. A power conversion apparatus comprising:

a power converter configured to convert first AC power comprising a first frequency into second AC power comprising a second frequency different from the first frequency;

a gate driver configured to drive the power converter;

a gate drive signal generator configured to generate a gate drive signal to be supplied to the gate driver;

two cutoff devices coupled between the gate driver and the gate drive signal generator and configured to supply or cut off the gate drive signal to the gate driver based on a command from an external apparatus, at least one cutoff device among the two cutoff devices being configured to generate a first feedback signal related to an output signal of the at least one cutoff device;

analyzing means for analyzing the command from the external apparatus and the first feedback signal from the at least one cutoff device so as to determine whether the at least one cutoff device has a first abnormality; and cutoff controlling means for controlling another cutoff device among the two cutoff devices to cut off the gate drive signal to the gate driver when the analyzing means determines that the at least one cutoff device has the first abnormality.

* * * * *